United States Patent [19]

Foldes et al.

[11] 3,888,914

[45] June 10, 1975

[54] NOVEL CHEMICAL COMPOUNDS, PROCESSES FOR MAKING THEM AND PHARMACEUTICAL COMPOSITIONS CONTAINING THEM

[75] Inventors: Andre Foldes; Geza Delmar, both of Montreal, Quebec, Canada

[73] Assignee: Delmar Chemicals, Limited, Ville LaSalle, Quebec, Canada

[22] Filed: Oct. 10, 1972

[21] Appl. No.: 296,074

Related U.S. Application Data

[63] Continuation of Ser. No. 9,417, Feb. 6, 1970, abandoned.

[52] U.S. Cl. ...... 260/501.16; 260/501.2; 260/248.5; 260/268 R; 260/268 T; 260/293.51; 260/293.53; 424/316
[51] Int. Cl. ............................................ C07c 63/00
[58] Field of Search .................... 260/501.16, 501.2

[56] References Cited
UNITED STATES PATENTS

| | | | |
|---|---|---|---|
| 2,220,692 | 11/1940 | Tabern et al. | 260/501.2 X |
| 3,019,166 | 1/1962 | Zellner | 260/501.2 X |
| 3,271,248 | 9/1966 | Renault et al. | 260/501.2 X |

FOREIGN PATENTS OR APPLICATIONS

| | | |
|---|---|---|
| 860,303 | 2/1961 | United Kingdom |
| 889,152 | 2/1962 | United Kingdom |

OTHER PUBLICATIONS

Gilman et al., J. Am. Chem. Soc., Vol. 77, pp. 6644–6646 (1955).

*Primary Examiner*—Bernard Helfin
*Assistant Examiner*—Nicky Chan
*Attorney, Agent, or Firm*—Christen & Sabol

[57] ABSTRACT

New chemical compounds in the form of amine salts of the known acid, para-chlorophenoxyisobutyric acid, are usually obtained as crystalline powders that can be readily handled and processed into solid pharmaceutical formulations, for example, tablets, for oral administration. The amine salts are effective in reducing the cholesterol level of blood serum.

2 Claims, 14 Drawing Figures

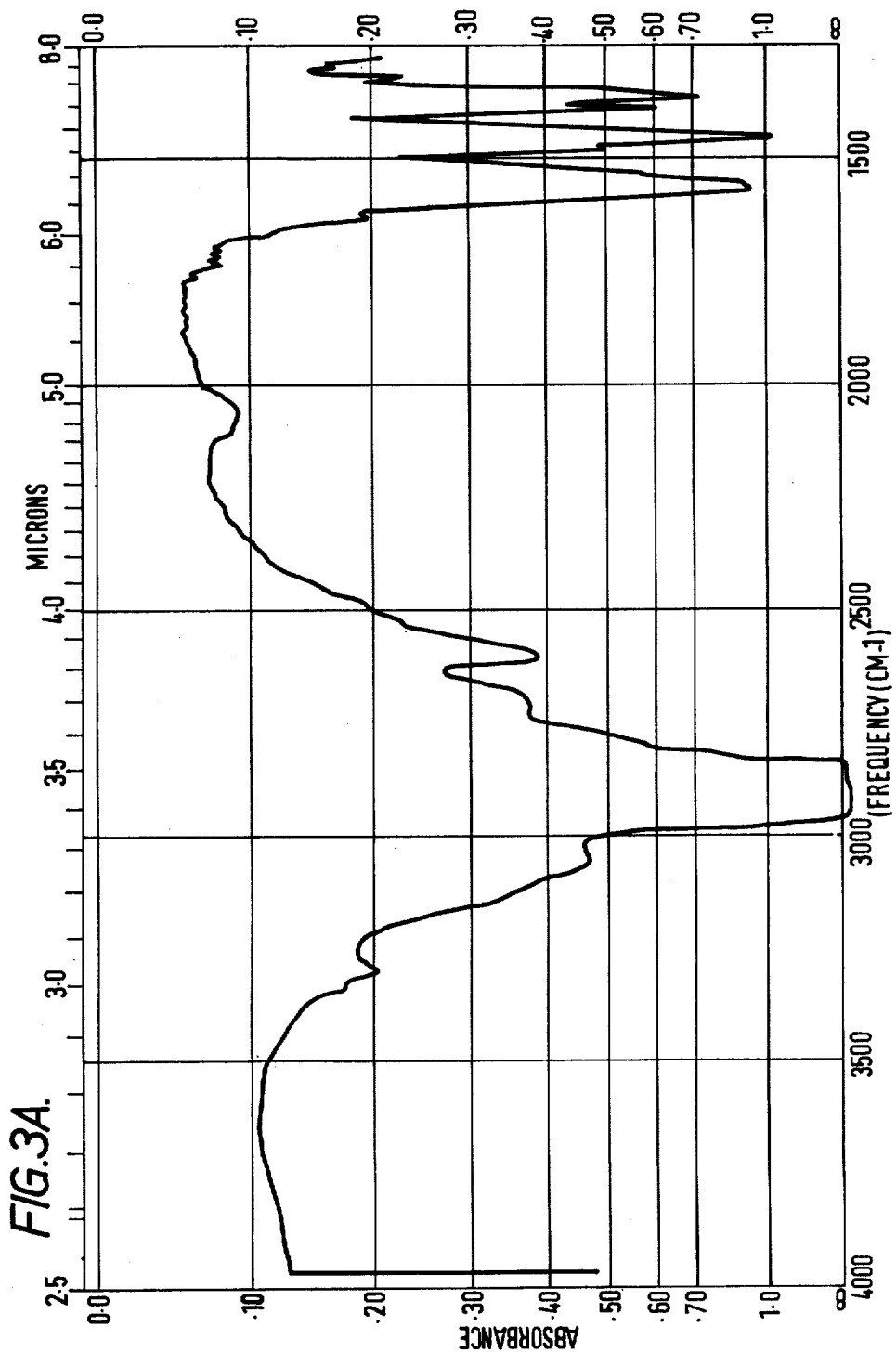

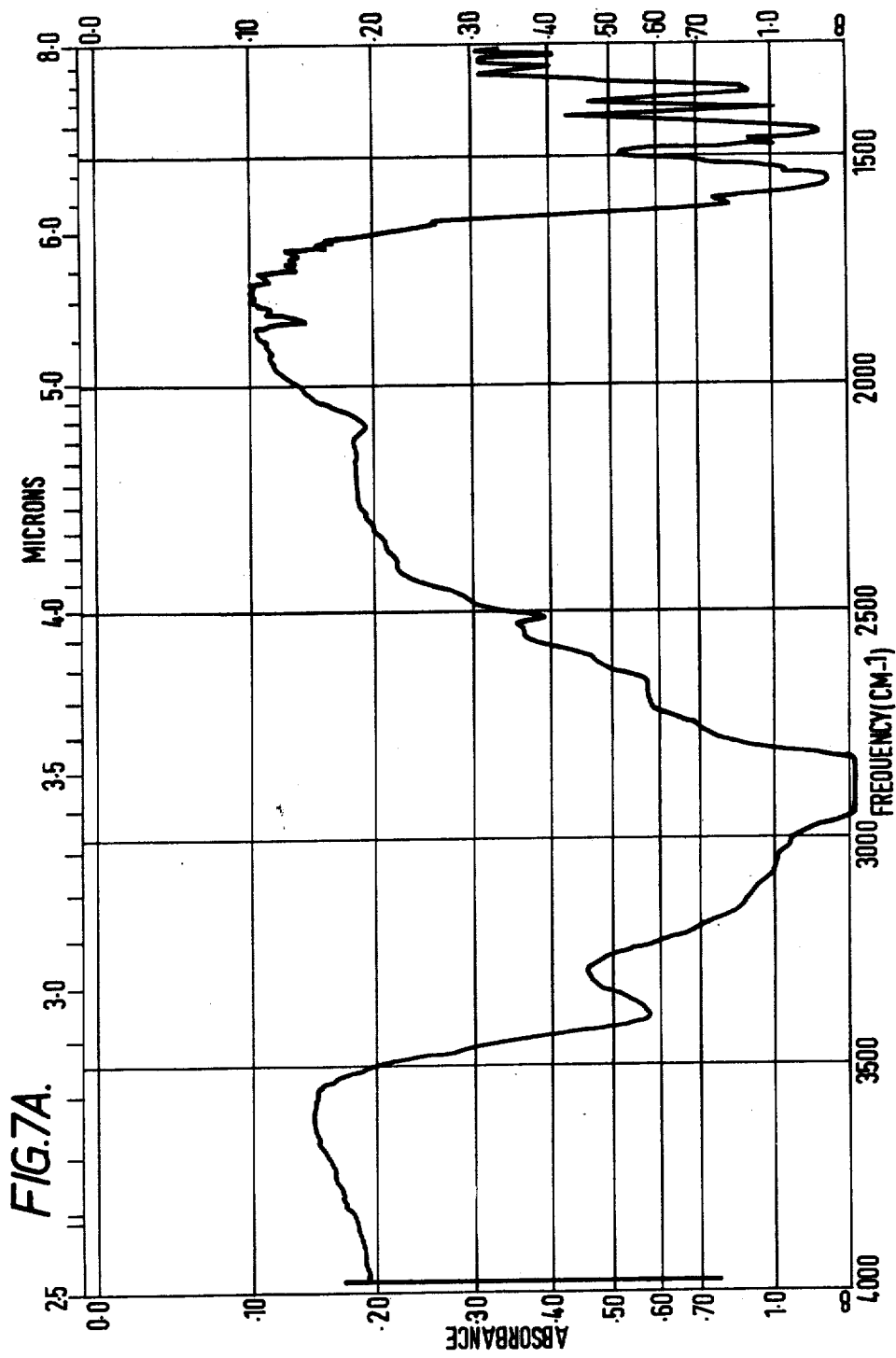

NOVEL CHEMICAL COMPOUNDS, PROCESSES FOR MAKING THEM AND PHARMACEUTICAL COMPOSITIONS CONTAINING THEM

This is a continuation of application Ser. No. 9,417 filed Feb. 6, 1970, now abandoned.

BACKGROUND OF THE INVENTION

1. Field of the Invention

The present invention relates to novel compounds, to processes for making them and to pharmaceutical compositions in which they are present as active constituents. More particularly, this invention is directed to compounds in the form of a novel class of salts of the known organic acid, para-chlorophenoxyisobutyric acid, and to pharmaceutical compositions containing such salts.

2. Description of the Prior Art

Para-chlorophenoxyisobutryic acid which has the formula:

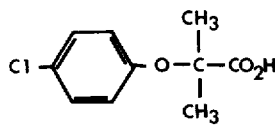

and the alkali metal and alkaline earth metal salts thereof, as well as esters such as ethyl-4-chloro-2-phenoxyisobutyrate (commonly referred to as "Clofibrate"), are known to reduce the concentration of cholesterol in the blood serum. For this reason, some of these compounds, especially "Clofibrate" itself, have been used in the treatment of such conditions as coronary artery disease and artherosclerosis. However, such compounds, say, the best known at the present time, namely "Clofibrate," are normally obtained in the form of oils; for instance, "Clofibrate" is a colorless to pale yellow oil with a boiling point of 148° to 150°C/20 mm., methyl-4-chloro-2-phenoxyisobutyrate is an oil with a boiling point at 148° to 150°C/20 mm., n-propyl-4-chloro-2-phenoxyisobutyrate is an oil with a boiling point of 167° to 169°C/15 mm., and n-butyl-4-chloro-2-phenoxyisobutyrate is an oil with a boiling point of 178° to 182°C/15 mm. Consequently, those compounds are inconvenient to handle and usually need to be administered orally in the form of emulsions or capsules. This oral administration of such compounds is not only less convenient than the administration of a solid preparation such as tablets, but is also found to be associated with gastro-intestinal upsets such as diarrhoea or irritation of the mucosae of the digestive tract.

SUMMARY OF THE INVENTION

A general object of this invention is to provide organic salts of the aforementioned p-chlorophenoxyisobutyric acid that usually are obtained in crystalline powder form, and which consequently are more convenient to handle and have other significant advantages compared to the liquid (oily) derivatives of the prior art. We have now found that a particular novel class of salts of the aforementioned p-chlorophenoxyisobutyric acid is normally obtained in crystalline powder form that can be readily handled and processed into solid pharmaceutical formulations such as tablets that are more conveniently administered than the liquid formulations of the prior art with reduced side effects.

Broadly stated, this invention, in one of its composition of matter aspects provides novel compounds characterised as amine salts of a p-chlorophenoxyisobutyric acid.

In its process aspect, the invention provides a process for making such amine salts by the reaction of the corresponding amine with the free p-chlorophenoxyisobutyric acid, and recovering the salt from the reaction medium.

DETAILED DESCRIPTION OF THE INVENTION

Figure 1A:
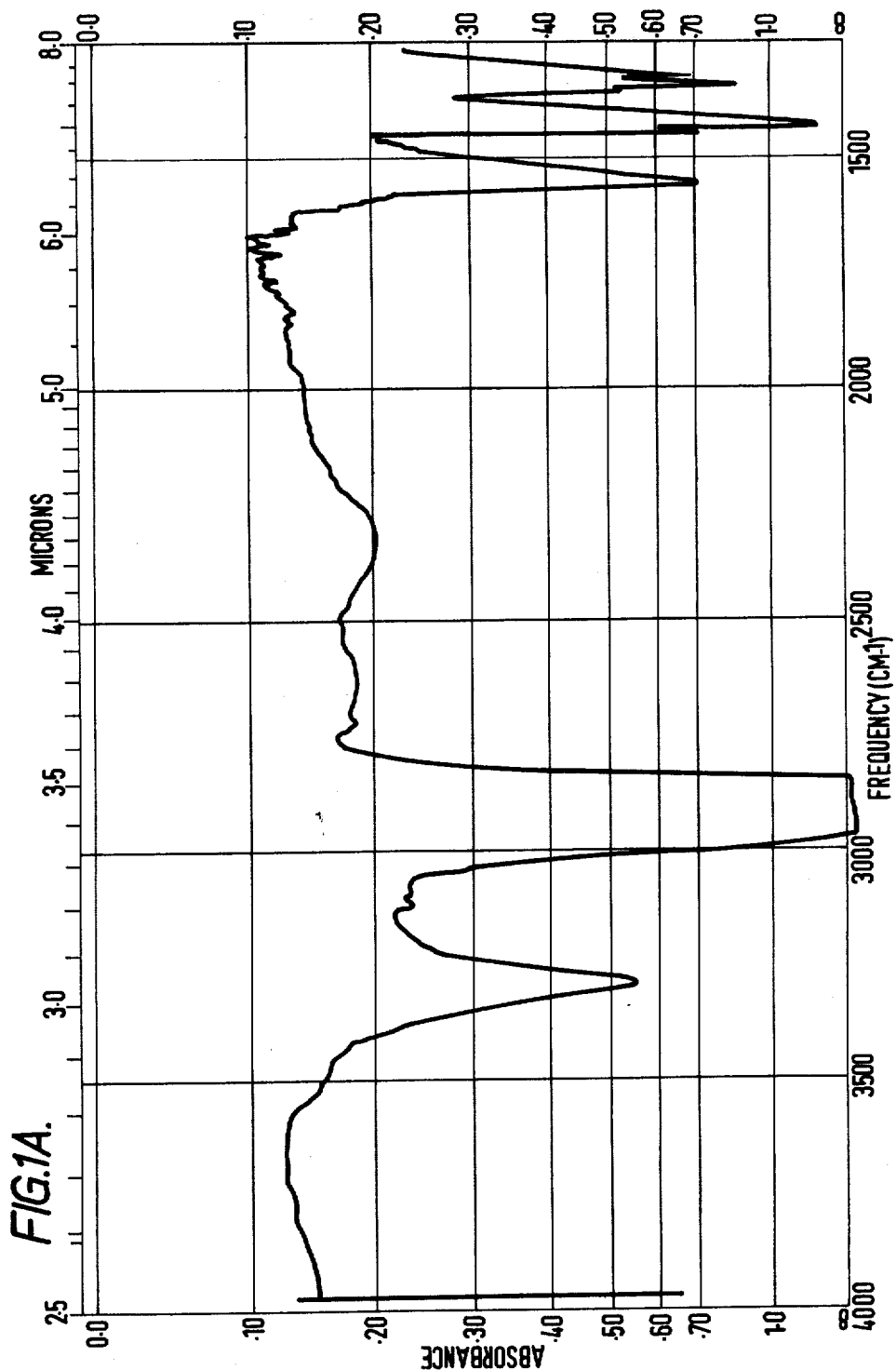

Illustrative of the amine salts of this invention are the following groups of compounds:

A. Amine salts derived from the reaction of a tertiary amine and the free p-chlorophenoxyisobutyric acid, and having the following general formula:

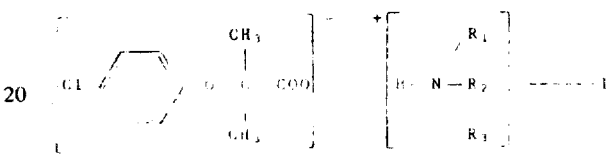

wherein $R_1$, $R_2$ and $R_3$, which may be the same or different, represent hydrogen, alkyl, preferably lower alkyl, hydroxy alkyl, preferably hydroxy-lower alkyl, aryl or aralkyl.

The term "lower" as used herein in relation to alkyl and hydroxy alkyl and, at a later passage, alkylene groups connotes a group containing from 1 to 6 carbon atoms inclusive, such, for example, as methyl, ethyl, propyl, isopropyl, butyl, isobutyl, hydroxy-methyl, hydroxy-ethyl, hydroxy-isopropyl, hydroxy-butyl, hydroxy-isobutyl.

Preferred amine salts of the general formula I are derived from tertiary amines or strongly basic amine alcohols such, for example, as tri-n-propylamine, tri-n-butylamine, tri-n-pentylamine, tri-isopropylamine, tri-isobutylamine, tri-isopentyl amine, tri-n-hexylamine, ethanolamine, tri-isopropanolamine, tris-(hydroxymethyl)-aminomethane 2-amino-2-methyl-1-propanol, triethanolamine, 2-isopropylaminoethanol, 2-dimethylaminoethanol, 3-dimethylamino-1-propanol, 2-dibutylaminoethanol, 1-diethylamino-2-propanol, 3-diethylamino-1-propanol, 1-dibutylamino-2-propanol, and 3-dibutylamino-1-propanol, which, on reaction with the free acid under appropriate conditions, give the tri-n-propylamine salt, the tri-n-butylamine salt, the tri-n-pentylamine salt, the tri-isopropylamine salt, the tri-isobutylamine salt, the tri-isopentylamine salt, the tri-n-hexylamine salt, the ethanolamine salt, the tri-isopropanolamine salt, the tris-(hydroxymethyl)-aminomethane salt, the 2-amino-2-methyl-1-propanol salt, the triethanolamine salt, the 2-iso-propylaminoethanol salt, the 2-dimethylaminoethanol salt, the 3-dimethylamino-1-propanol salt, the 2-dibutylaminoethanol salt, the 1-diethylamino-2-propanol salt, the 3-diethylamino-1-propanol salt, the 1-dibutylamino-2-propanol salt and the 3-dibutylamino-1-propanol salt respectively of parachlorophenoxyisobutyric acid.

Diamine salts derived from the reacting of a diamine with the free p-chlorophenoxyisobutyric acid. Preferably, 1 molar equivalent of the diamine is reacted with 2 molar equivalents of the p-chlorophenoxyisobutyric acid to give a diamine salt of the following general formula:

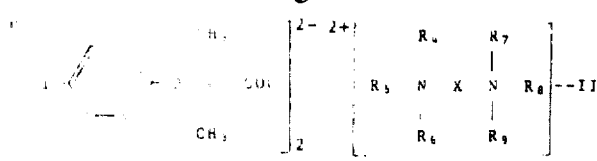

wherein X is an unsubstituted or substituted straight or branched chain alkylene, preferably lower alkylene group, and $R_4$, $R_5$, $R_6$, $R_7$, $R_8$ and $R_9$ independently are hydrogen or lower alkyl.

Preferred diamine salts of the general formula II are those derived from unsubstituted, straight chain lower alkylene diamines such, for example, as ethylenediamine, 1,2-propanediamine, 1,3-propanediamine, 1,4-butanediamine, 1,5-pentanediamine, 1,6-hexamethylenediamine, n-methyl-1,3-propanediamine and 1,2-diamino-2-methylpropane which, on reaction with 2 molar equivalents of the free acid under appropriate conditions, give the ethylenediamine salt, the 1,2-propanediamine salt, the 1,3-propanediamine salt, the 1,4-butanediamine salt, the 1,5-pentanediamine salt, the 1,6-hexamethylenediamine salt, the n-methyl-1,3-propanediamine salt and the 1,2-diamino-2-methylpropane salt respectively of p-chlorophenoxyisobutyric acid.

These diamine salts are a particularly attractive embodiment of the invention in that, when the reactants are brought together in the molar proportions indicated, they contain a high percentage of the pharmacologically active acid moiety on a molar basis.

C. Cyclic amine salts formed by reaction of a corresponding cyclic amine, such as, for example, a heterocyclic amine, with the free p-chlorophenoxyisobutyric acid.

Illustrative of such cyclic amines are hexamethylenetetramine (methenamine), triethylenediamine, quinuclidine, piperazine, piperidine, N-methylpiperazine, 2-methylpiperazine, N-methylpiperidine, 2-methylpiperidine, 3-methylpiperidine and 4-methylpiperidine which, on reaction with the free acid under appropriate conditions, give the hexamethylenetetramine (methenamine) salt, the triethylenediamine salt, the quinuclidine salt, the piperazine salt, the piperidine salt, the N-methylpiperazine salt, the 2-methylpiperazine salt, the N-methylpiperidine salt, the 2-methylpiperidine salt, the 3-methylpiperidine salt and the 4-methylpiperidine salt respectively of p-chlorophenoxyisobutyric acid.

In carrying out the process of this invention in forming the amine salts, the appropriate amine and the free p-chlorophenoxyisobutyric acid are reacted together in a suitable solvent. Conveniently, the solvent is a non-polar organic liquid in which both reactants are readily soluble. The organic solvent of choice is benzene, but other suitable solvents for the reaction include chloroform, toluene and diethyl ether.

The reaction is preferably conducted at below ambient temperature, and the range 10° to 15°C is commonly associated with the smoothest reaction and highest yields of the desired amine salts. However, it may be effected at somewhat lower and higher temperatures, though temperatures above ambient temperature tend to favor gum-formation and lower yields, so are normally best avoided.

The amine salts so-obtained typically precipitate out of the reaction medium. They are then separated in a conventional manner, say, by filtration, and, if necessary, recrystallized from an organic solvent to give substantially pure amine salt, typically in the form of a fine, crystalline powder.

PREFERRED EMBODIMENTS OF THE INVENTION

The invention will be more clearly understood from consideration of the following illustrative Examples showing the preparation of preferred amine salts according to this invention. All melting point data was determined by the capillary tube technique.

EXAMPLE 1

Dimethylaminoethanol Salt

A solution of 1 gm. (0.011 mole) of dimethylaminoethanol in 5 ml. of dry benzene was added to a stirred solution containing 2.4 gm. (0.011 mole) of p-chlorophenoxyisobutyric acid in 50 ml. of dry benzene in an Erlenmeyer flask. The mixture was cooled in an ice bath to around 10°C, and a temperature of 10° to 15°C maintained for 2 hours during which period the mixture was continuously stirred. The dimethylaminoethanol salt of p-chlorophenoxyisobutyric acid which precipitated out was filtered off, washed with dry benzene, and dried at room temperature in a vacuum dessicator. This material was recrystallised from benzene-ether to give 1.0 gm. of the above identified product, of melting point 88°–90°C; a yield of 55.8 percent. This product was in the form of a white, almost odourless, crystalline powder.

Analysis

Calc. for $C_{14}H_{22}NO_4Cl$: C, 55.34%; H, 7.30%; N, 4.61%.
Found: C, 55.43%; H, 7.14%; N, 4.80%.

Other Characterising Data

Figure 1B:
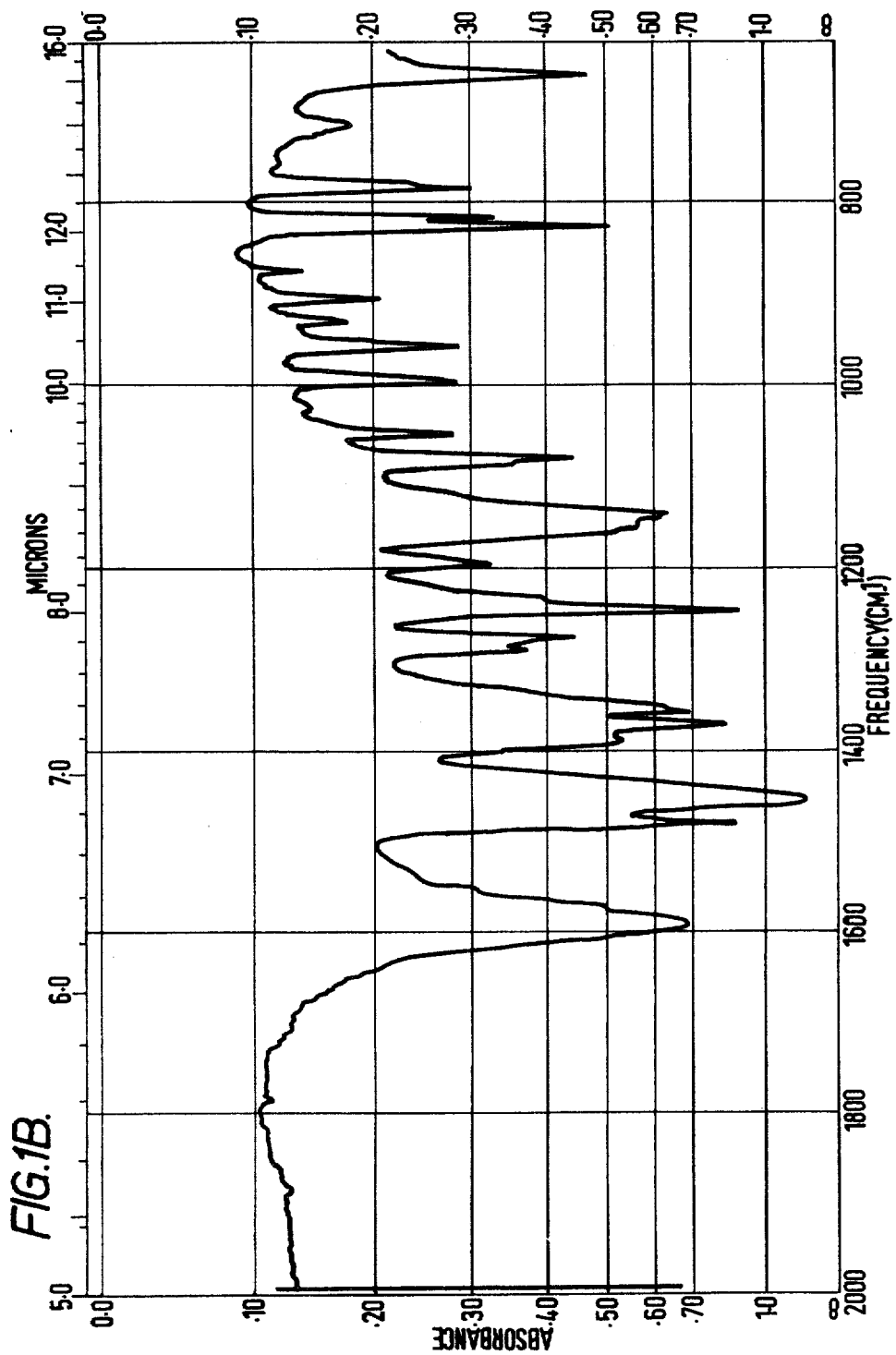

The infra-red spectrum of this compound taken in a Nujol mull is reproduced as FIGS. 1 A and B of the accompanying drawings. The compound was freely soluble in water, ethyl alcohol and chloroform. The molecular weight, as determined by the non-aqueous titration method, was 303.79.

EXAMPLE 2

Dimethylaminoethanol Salt

12 Gms. (0.056 mole) p-chlorophenoxyisobutyric acid was dissolved in 120 ml. of dry benzene, and 9 ml. ether added to give a clear solution. 5.4 Gms. (0.060 mole) dimethylaminoethanol dissolved in 6 ml. dry benzene was added to this clear solution which was continuously stirred. The mixture was then seeded and stirred for 2 hours at ambient temperature (24°C). The resulting precipitate was then filtered off, and washed with 3 ml. benzene to yield 15.2 gms. of the desired dimethylaminoethanol salt in the form of an off-white crystalline powder, melting point 90°C.

EXAMPLE 3

Triethanolamine Salt 1.5 Gm. (0.01 mole) triethanolamine was added to a stirred solution containing 2.15 gm. (0.01 mole) p-chlorophenoxyisobutyric acid in 35 ml. dry benzene in an Erlenmeyer flask. The mixture was cooled in an ice bath to around 10°C, and a temperature of 10° to 15°C maintained for 2 hours during which period the mixture was continuously stirred. The triethanolamine salt of p-chlorophenoxyisobutyric acid which precipitated out was filtered off, washed with dry benzene, and dried at room temperature in a vacuum dessicator. This material was recrystallised from benzene-hexane to give 3.3 gm. of the above named product, melting point 104° to 106°C; a yield of 89.9 percent. This product was in the form of a white, almost odorless, crystalline powder.

Analysis
  Calc. for $C_{16}H_{26}NO_6Cl$: C, 52.81%; H, 7.20%; N, 3.85%.
        Found: C, 52.41%; H, 7.07%; N, 4.36%.

Infra-red Spectrum

Figure 2A:
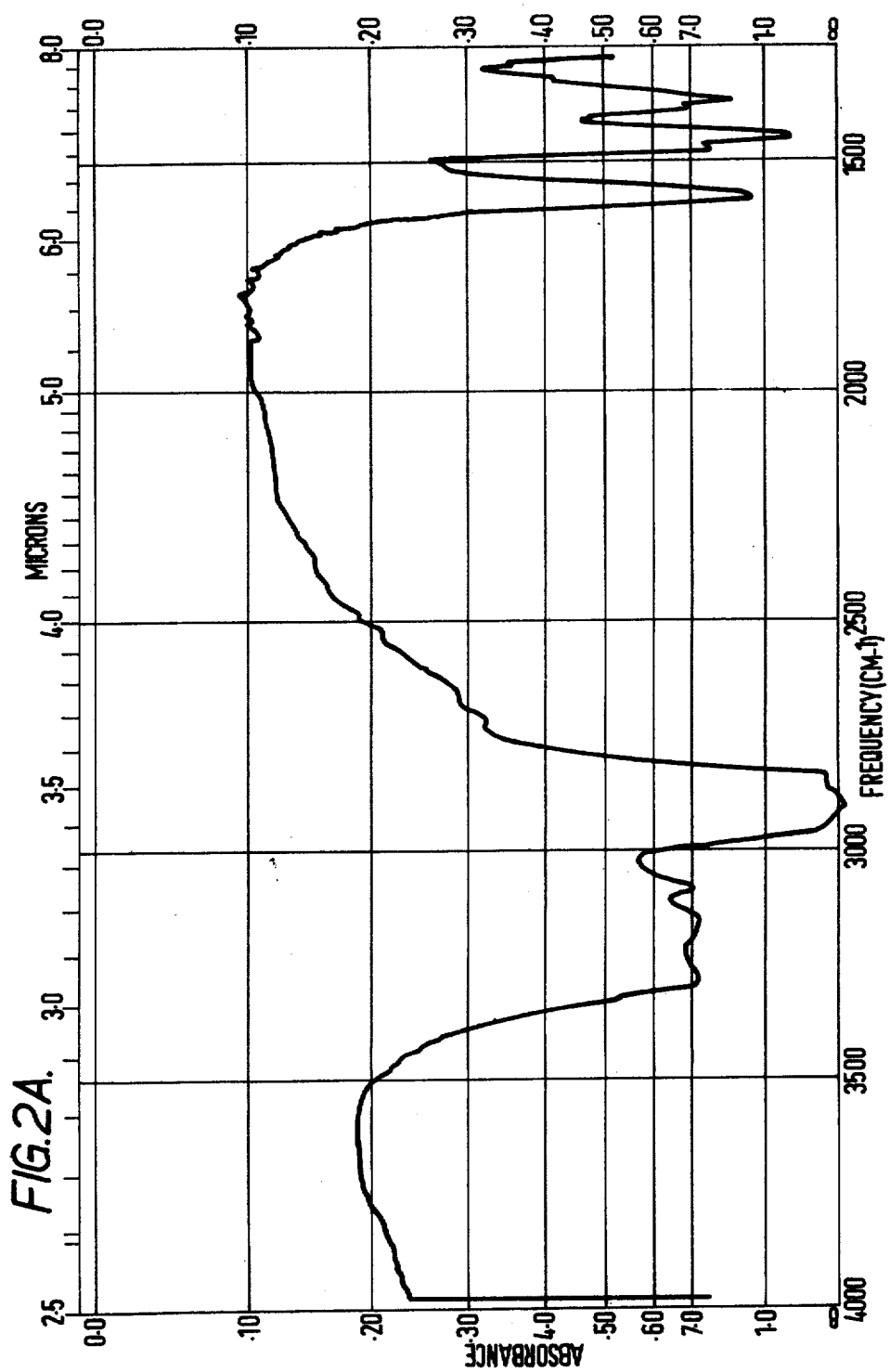
Figure 2B:
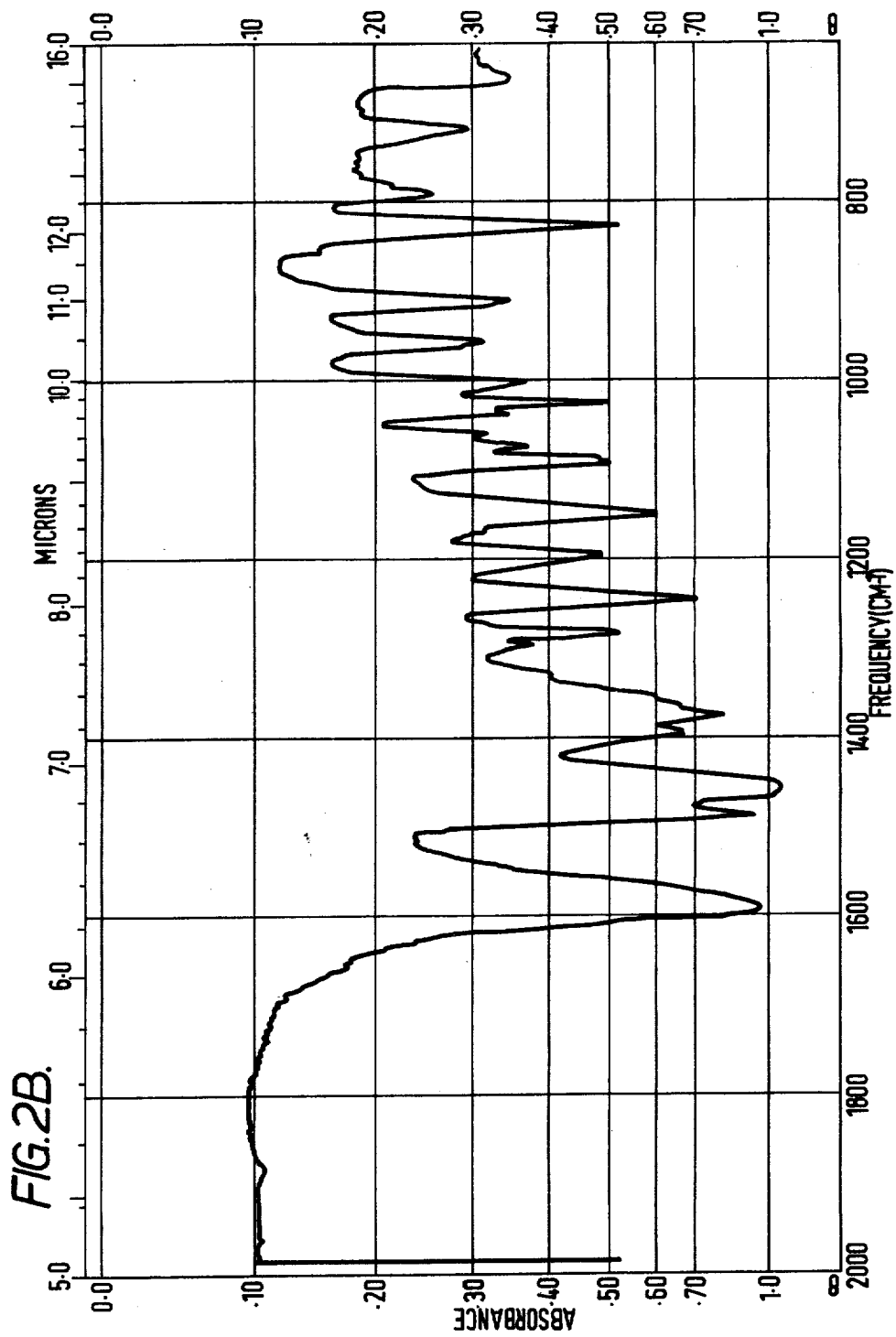

The infra-red spectrum of this compound taken in a Nujol mull is reproduced as FIGS. 2 A and B of the accompanying drawings.

EXAMPLE 4

2-Amino-2-Methyl-1-Propanol Salt 1.8 Gm. (0.02 mole) 2-amino-2-methyl-1-propanol was added to a stirred solution containing 4.3 gm. (0.02 mole) p-chlorophenoxyisobutyric acid in 65 ml. dry benzene in an Erlenmeyer flask. The mixture was cooled in an ice bath to around 10°C, and a temperature of 10° to 15°C maintained for 2 hours during which period the mixture was continuously stirred. The 2-amino-2-methyl-1-propanol salt of p-chlorophenoxyisobutyric acid which precipitated out was filtered off, washed with dry benzene, and dried at room temperature in a vacuum dessicator. This material was recrystallised from benzene-hexane to give 5.8 gm. of the above named product, melting point 151° to 154°C; a yield of 95.0 percent. This product was in the form of a white, almost odorless, crystalline powder.

C
Analysis
  Calc. for $C_{14}H_{22}NO_4Cl$: C, 55.34%; H, 7.30%; N, 4.61%.
        Found: C, 55.11%; H, 7.07%; N, 4.47%.

Infra-red Spectrum

Figure 3B:
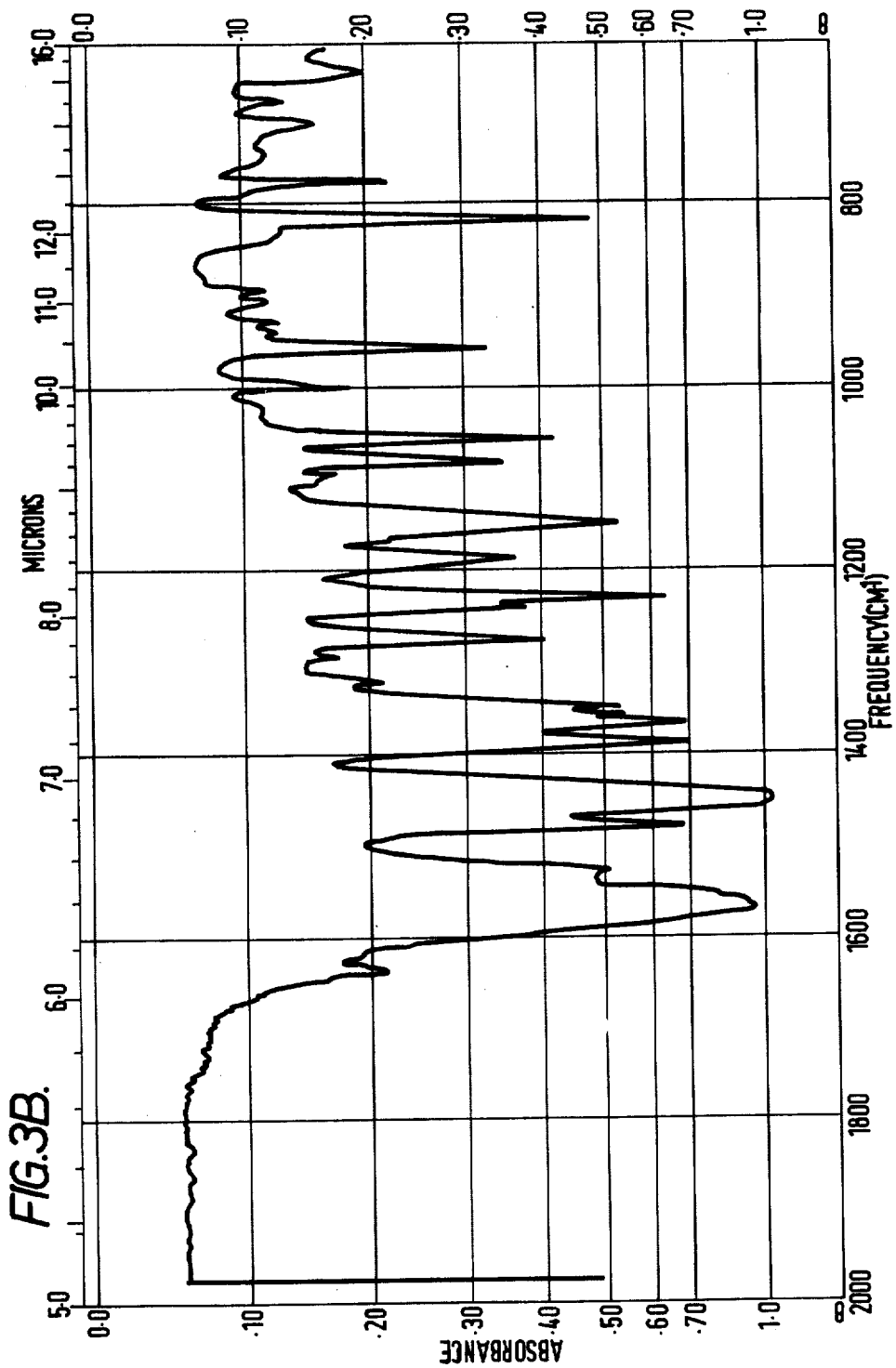

The infra-red spectrum of this compound taken in a Nujol mull is reproduced as FIGS. 3 A and B of the accompanying drawings.

EXAMPLE 5

Hexamethylenetetramine Salt

1 Gm. (0.007 mole) hexamethylenetetramine (methenamine) was added to a stirred solution containing 1.52 gm. (0.007 mole) p-chlorophenoxyisobutyric acid in 30 ml. dry benzene in an Erlenmeyer flask. The mixture was cooled in an ice bath to around 10°C, and a temperature of 10° to 15°C maintained for 2 hours during which period the mixture was continuously stirred. The methenamine salt of p-chlorophenoxyisobutyric acid which precipitated out was filtered off, washed with dry benzene, and dried at 50°C in a vacuum dessicator. This material was recrystallized from benzene to give 1.6 gm. of the desired above named product, of melting point 113° to 116°C; a yield of 63.4 percent. This product was in the form of a white, almost odorless, crystalline powder.

Analysis
  Calc. for $C_{16}H_{23}N_4O_3Cl$: C, 54.15%; H, 6.53%; N, 15.78%.
        Found: C, 54.28%; H, 6.82%; N, 15.95%.

Infra-red Spectrum

Figure 4A:
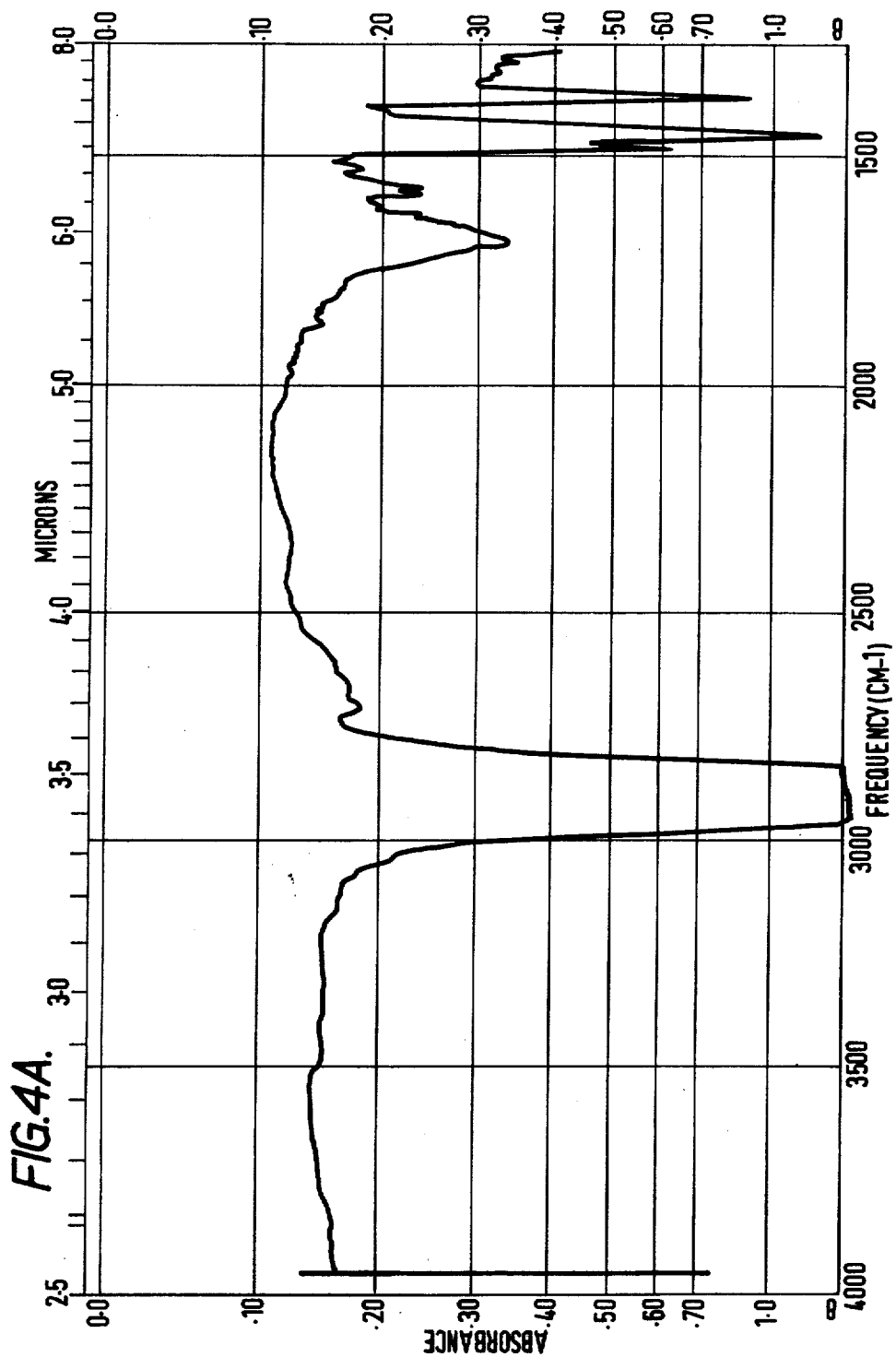
Figure 4B:
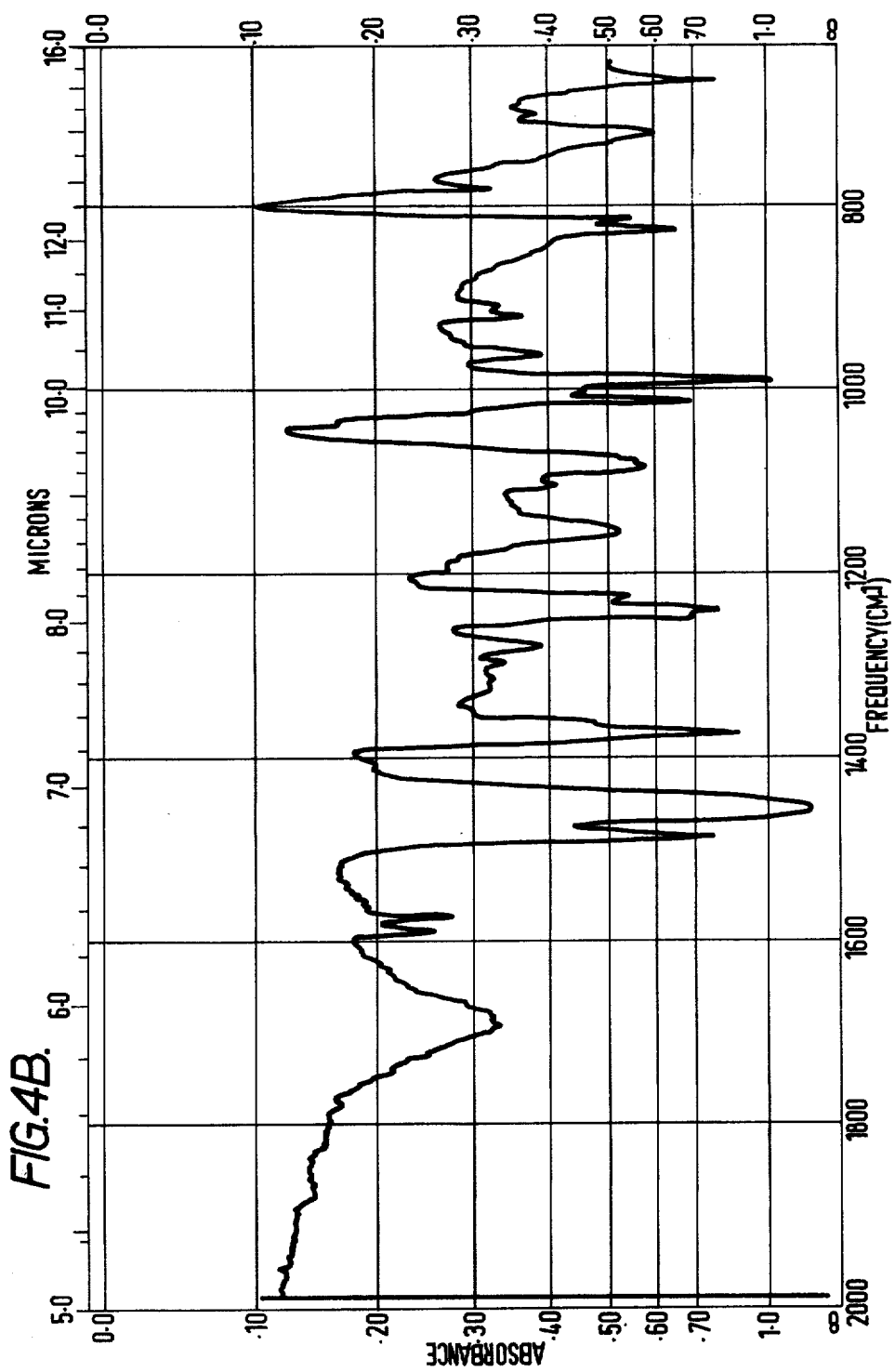

The infra-red spectrum of this compound taken in a Nujol mull is reproduced as FIGS. 4 A and B of the accompanying drawings.

EXAMPLE 6

Ethylenediamine Salt

1 Gm. (0.0166 mole) ethylenediamine in 5 ml. of dry benzene was added to a stirred solution containing 7.1 gm. (0.033 mole) p-chlorophenoxyisobutyric acid in 135 ml. dry benzene in an Erlenmeyer flask. The mixture was cooled in an ice bath to around 10°C, and a temperature of 10° to 15°C maintained for 2 hours during which period the mixture was continuously stirred. The ethylenediamine salt of p-chlorophenoxyisobutyric acid which precipitated out was filtered off, washed with dry benzene, and dried at 50°C in a vacuum dessicator. This material was recrystallized from methanol/ether to give 6.8 gm. of the desired above named product, of melting point 187° to 192°C; a yield of 82.9 percent. This product was in the form of a white, almost odorless, crystalline powder.

Analysis
  Calc. for $C_{22}H_{30}N_2O_6Cl_2$: C, 53.99%; H, 6.17%; N, 5.72%.
        Found: C, 54.14%; H, 6.05%; N, 5.64%.

Infra-red Spectrum

Figure 5A:
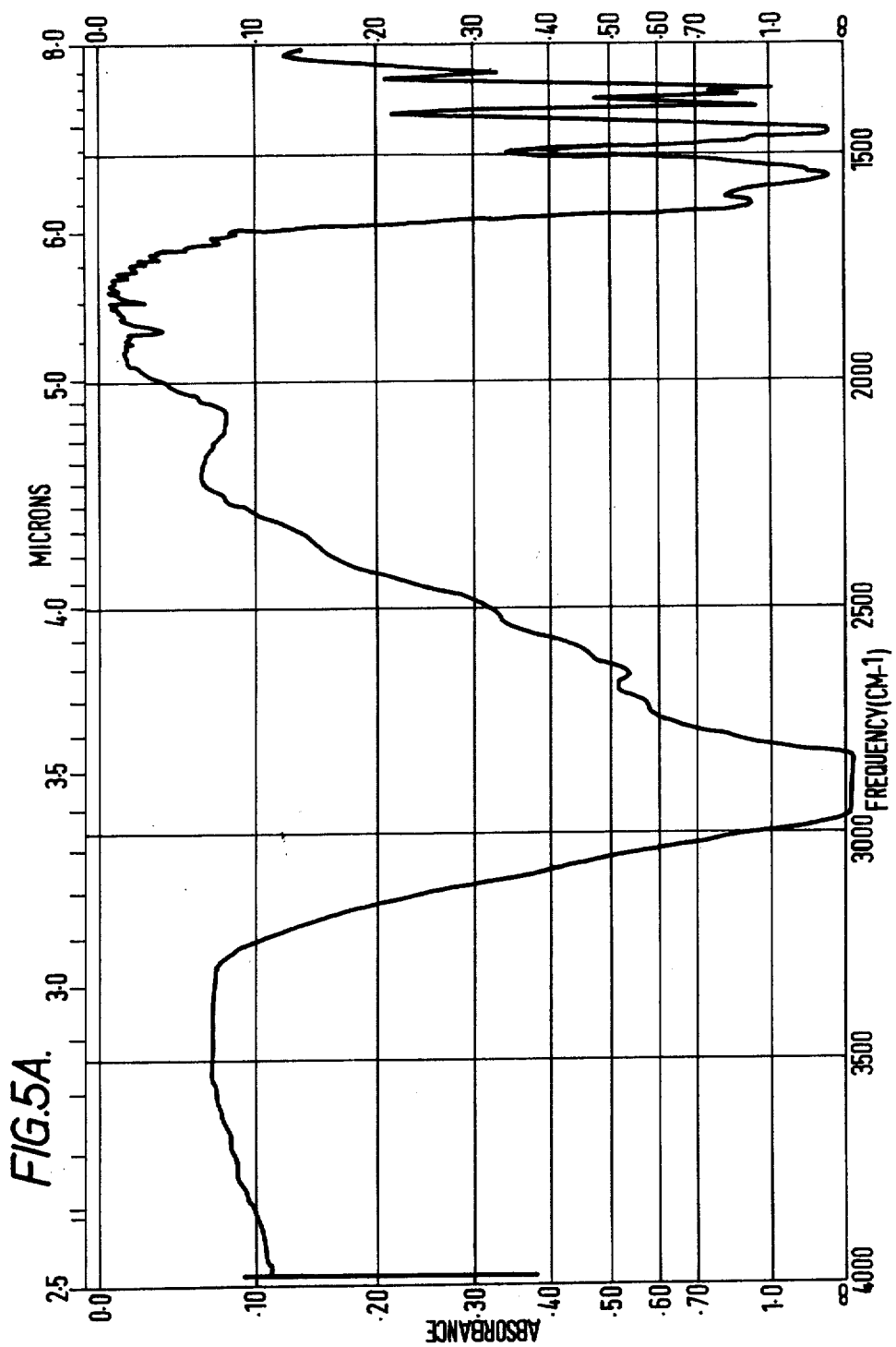
Figure 5B:
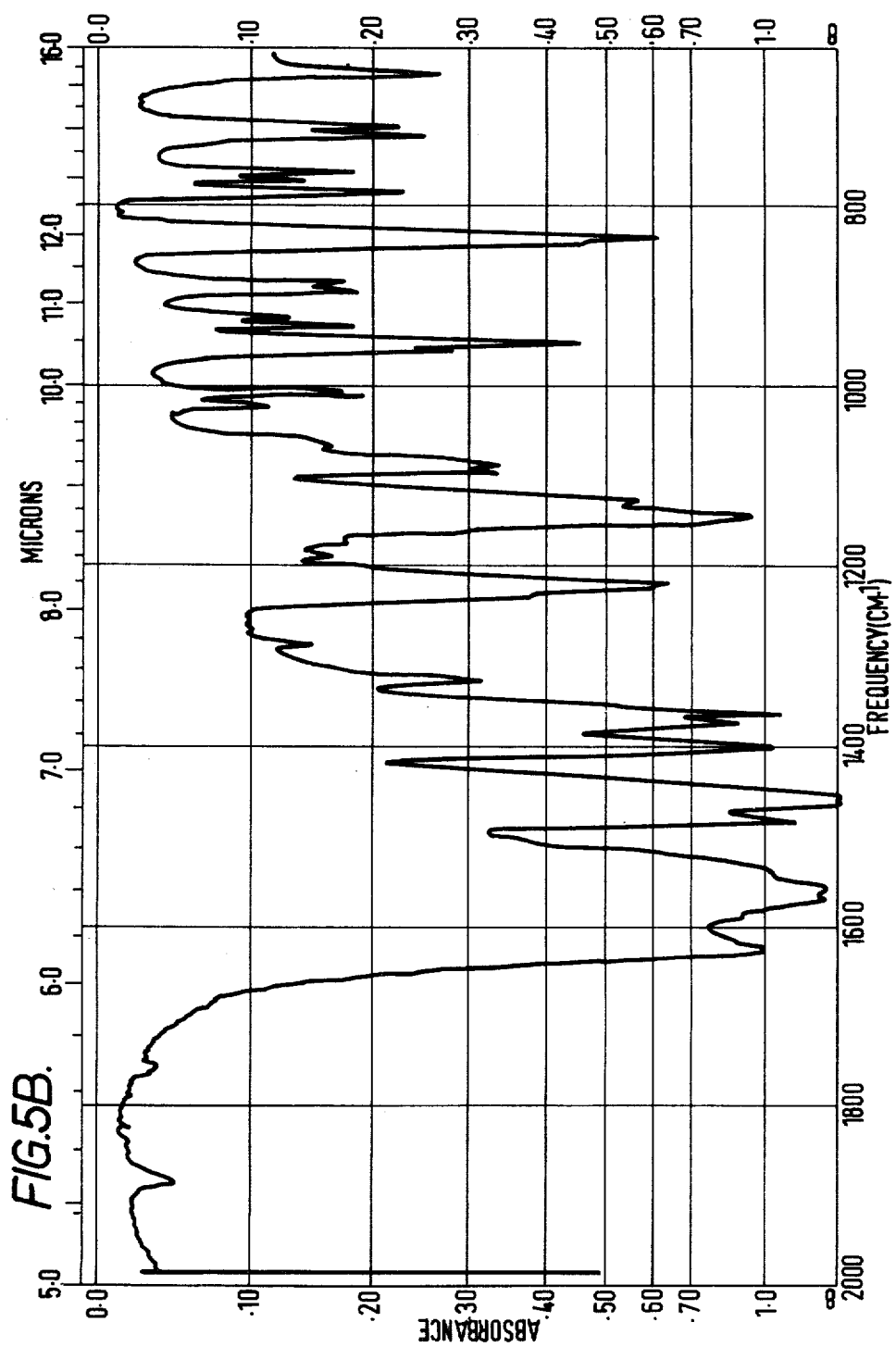

The infra-red spectrum of this compound taken in a Nujol mull is reproduced as FIGS. 5 A and B of the accompanying drawings.

EXAMPLE 7

Hexamethylenediamine Salt

1 Gm. (0.008 mole) hexamethylenediamine was added to a stirred solution containing 3.64 gm. (0.016 mole) p-chlorophenoxyisobutyric acid in 70 ml. dry benzene in an Erlenmeyer flask. The mixture was cooled in an ice bath to around 10°C, and a temperature of 10° to 15°C maintained for 2 hours during which period the mixture was continuously stirred. The hexamethylene diamine salt of p-chlorophenoxyisobutyric acid which precipitated out was filtered off, washed with dry benzene, and dried at 50°C in a vacuum dessicator. This material was recrystallized from methyl alcohol to give 4.0 gm. of the desired above named product, of melting point 221° to 223°C; a yield of 86.2 percent. This product was in the form of a white, almost odorless, crystalline powder.

Analysis

Calc. for $C_{26}H_{38}N_2O_6Cl_2$: C, 57.27%; H, 7.07%; N, 5.13%.
Found: C, 57.14%; H, 6.87%; N, 5.27%.

Infra-red Spectrum

Figure 6A:
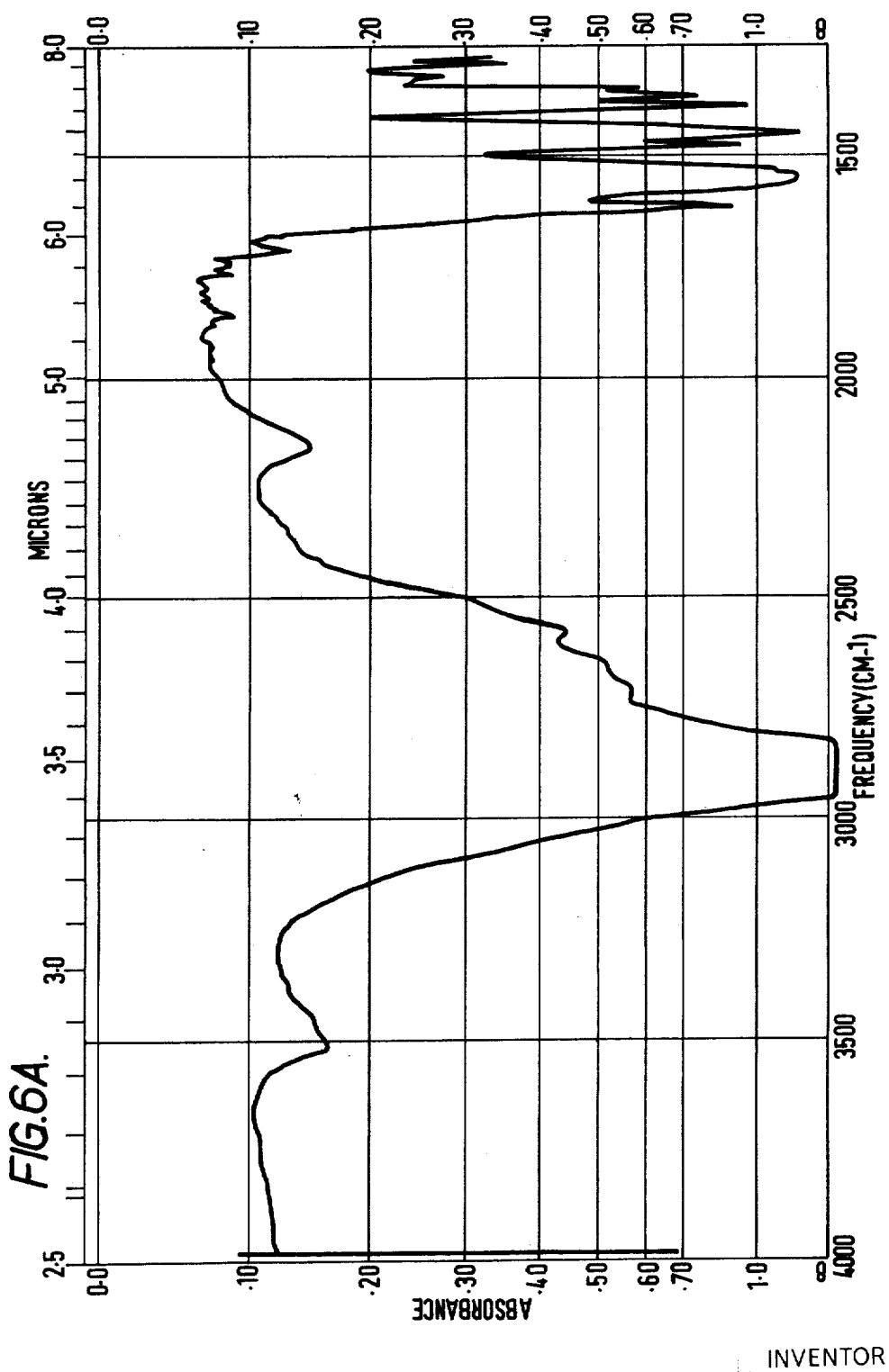
Figure 6B:
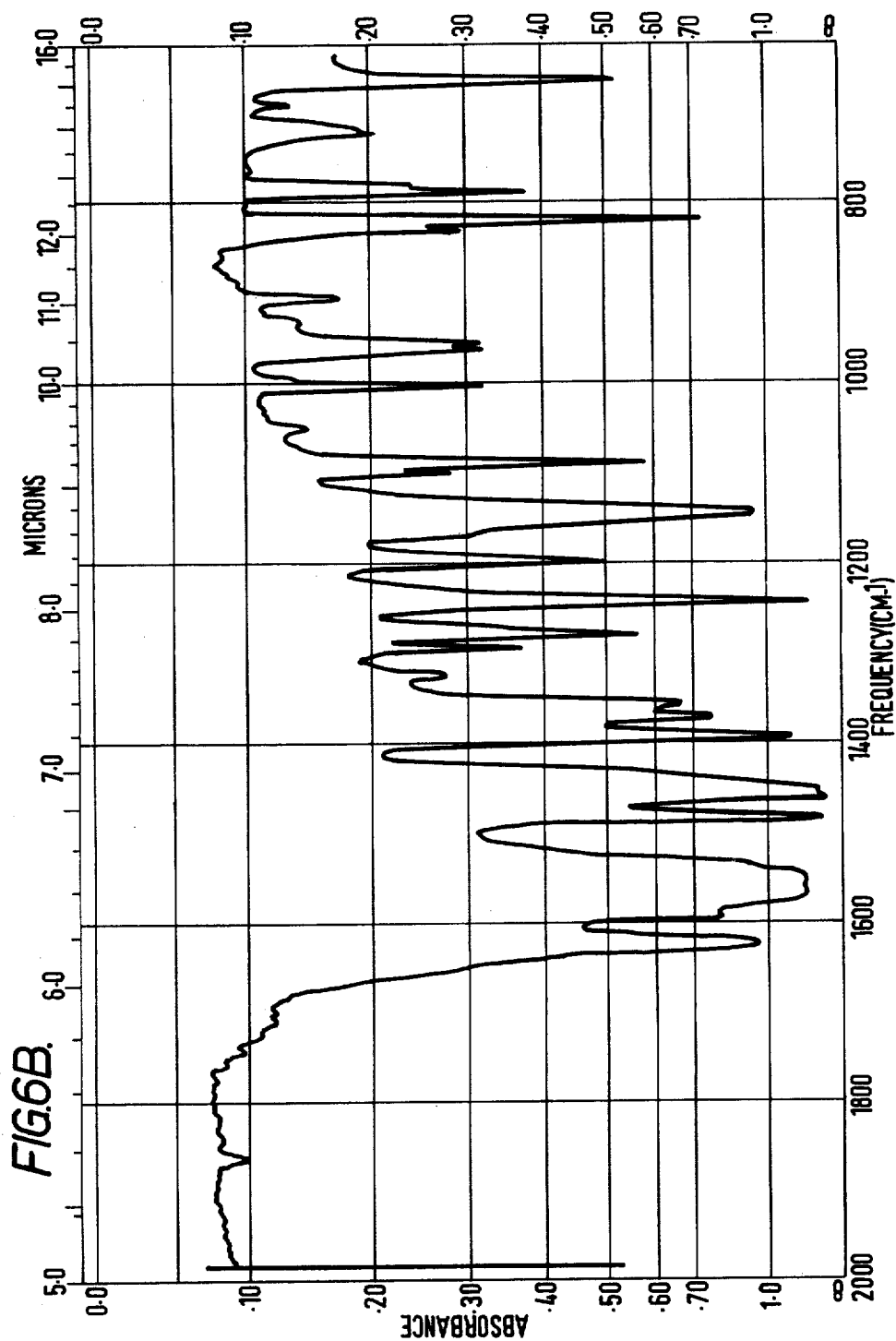

The infra-red spectrum of this compound taken in a Nujol mull is reproduced as FIGS. 6 A and B of the accompanying drawings.

EXAMPLE 8

Ethanolamine Salt

1 Gm. (0.016 mole) ethanolamine was added to a stirred solution containing 3.43 gm. (0.016 mole) p-chlorophenoxyisobutyric acid in 70 ml. dry benzene in an Erlenmeyer flask. The mixture was allowed to stand at room temperature (25°C) for 1.½ hours during which period the mixture was continuously stirred. The ethanolamine salt of p-chlorophenoxyisobutyric acid which precipitated out was filtered off, washed with dry benzene, and dried at 50°C in a vacuum dessicator. This material was recrystallized from benzene/ether to give the desired ethanolamine salt, of melting point 55° to 62°C in good yield. This product was in the form of a white, almost odorless, hygroscopic powder, and the assay, by non-aqueous titration, was 98.8 percent on the anhydrous basis.

Infra-red Spectrum

Figure 7B:
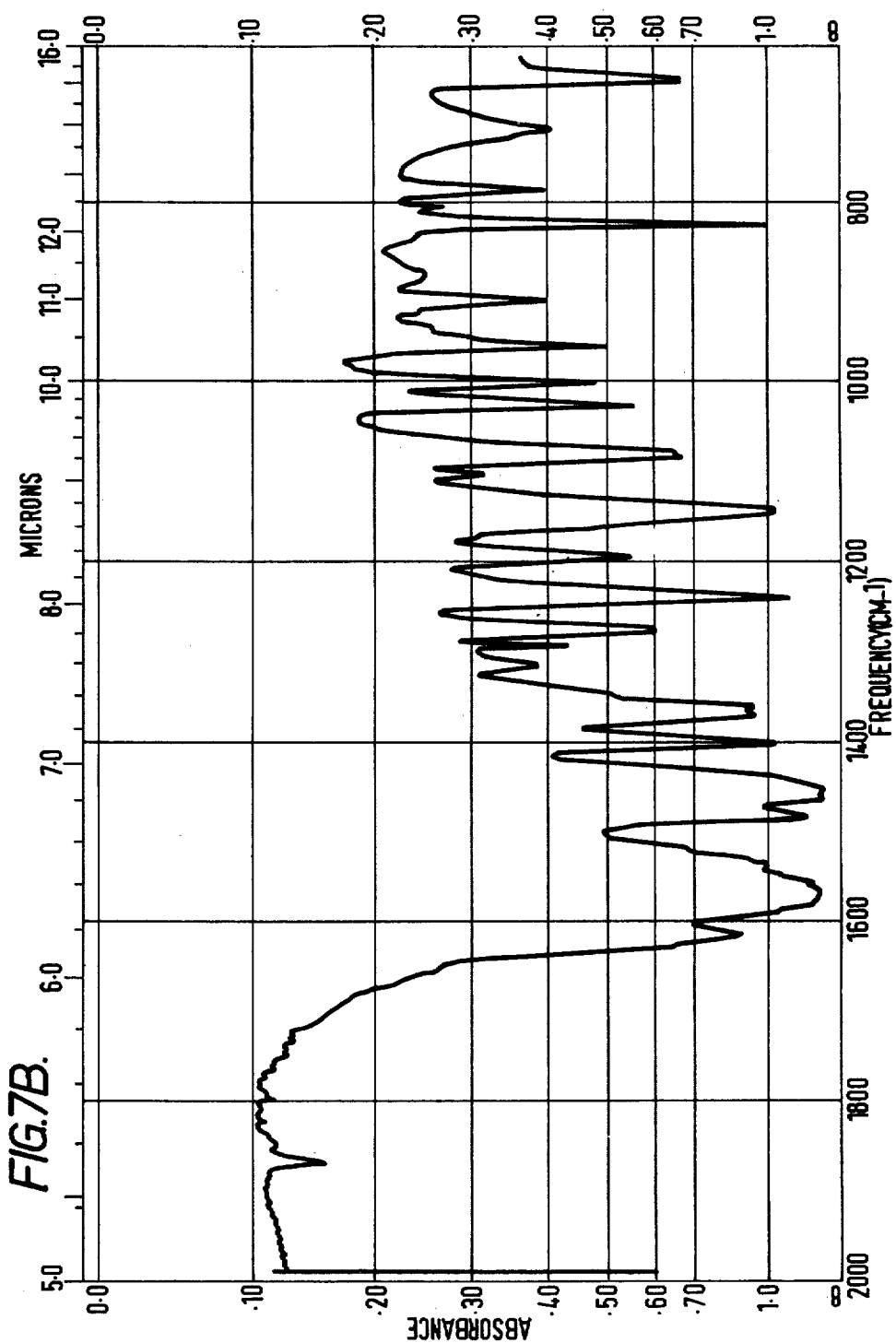

The infra-red spectrum of this compound taken in a Nujol mull is reproduced as FIGS. 7 A and B of the accompanying drawings.

As will be apparent from the foregoing Examples, the various amine salts are usually obtained in crystalline, powdered form which means that they can be readily formulated and administered as solid pharmaceutical compositions especially as tablets, each containing a predetermined dose of the amine salt(s). In these compositions, the salts, as the active ingredient(s), are admixed with any of the usual pharmaceutically acceptable solid carriers such, for example, as magnesium carbonate, talc, starch, lactose and, if desired, may contain as accessory ingredients any acceptable excipients, for example, diluents, buffers and flavoring, binding, dispersing, lubricating and coating materials.

Two illustrative examples of suitable tablet formulations are given below:

Example A

| Formulation Ingredient | Content | |
|---|---|---|
| Ethylenediamine salt of p-chlorophenoxyisobutyric acid | 175 | g. |
| Lactose | 502.25 | g. |
| Starch | 122 | g. |
| Dextrin (20% Solution) | | q.s. |
| Stearic acid | 3.5 | g. |
| Magnesium stearate | 1.75 | g. |

Procedure

The amine salt, lactose and starch were dried and passed through a sieve of aperture size 420μ. This mixture was then granulated with the 20 percent dextrin solution, sifted at aperture size 700μ, air-dried at room temperature overnight, and again sifted at aperture size 700μ. The dried granules were thoroughly mixed with the stearic acid and magnesium stearate as lubricating agents and thereafter compressed into 230 mg. scored tablets (each containing 50 mg. of the amine salt) on a suitable tabletting die.

Example B

| Formulation Ingredient | Content | |
|---|---|---|
| Metheneamine salt of p-chlorophenoxyisobutyric acid | 500 | g. |
| Starch | 65 | g. |
| Starch mucilage | | q.s. |
| Magnesium stearate | 5 | g. |

Procedure

The amine salt and the starch were dried and passed through a sieve of aperture size 420μ. This mixture was then granulated with the starch mucilage, sifted at aperture size 700μ, air-dried at room temperature overnight, and again sifted at aperture size 700μ. The dried granules were thoroughly mixed with the magnesium stearate and thereafter compressed into 285 mg. tablets (each containing 250 mg. of the amine salt) on a suitable tabletting die.

As mentioned hereinbefore, the various amine salts of this invention such as the specific salts identified in the foregoing Examples 1 to 8 have valuable therapeutic properties in reducing the cholesterol content in the blood stream. The therapeutic properties of the amine salts were determined by standard pharmacological tests, such as that described below in which the compound tested was the dimethylaminoethanol salt of p-chlorophenoxyisobutyric acid.

Method

Twenty-four young Sprague Dawley rats ranging in weight from 108 - 106 g. were divided into two groups and all fed powdered rat chow ad libitum. The first group served as controls and received no addition to their diet. Group II had the dimethylaminoethanol salt of p-chlorophenoxyisobutyric acid in amounts of 96 g. to 3920 g. of feed respectively. This was calculated to provide 2 percent of the diet as the active acid moiety. Animals were supplied with filled food dishes every other day and food consumption calculated from food not consumed. Animals were weighed at weekly intervals. After three weeks animals from each group were sacrificed daily. To produce a lipemia animals were fed 5 ml. of melted butter by gavage two hours before sacrificing. 5 Ml. blood was taken from the abdominal aorta, mixed with 0.45 ml. sodium citrate and platelet adhesiveness measured using a BYRSTON'S platelet Aggregometer (Byrston Manufacturing Ltd., Scarborough, Ontario), following the procedure described by Mustard et al., J. Lab & Clin. Med., 64, 548-559, 1964.

The instrument used detects optical density changes in solution and measures the amount of platelet aggregation seen after adding adenoisine diphosphate as an aggregating agent at various concentrations.

Results

The results were obtained in the form of aggregometer tracings. All control animals showed the typical response and the control sample with 0.002 ml. of adenosine diphosphate (2.5 × 10⁻⁴) added showed a decrease in density which was not seen in blood from the treated animals.

Samples of blood from all the control animals showed marked evidence of platelet aggregation. Blood from the animals fed the test compound showed no evidence of aggregation after adenosine diphosphate addition.

Toxicological Tests

The acute oral toxicity of the known compound, ethyl-4-chloro-2-phenoxyisobutyrate ("Clofibrate") and the novel ethylenediamine salt of p-chlorophenoxyisobutyric acid was determined in both the mouse and rat.

Method

Albino mice weighing 18–20 g. and albino rats weighing 150–200 g. obtained from the Canadian Breeding Laboratories were used. Food (Purina Rat Chow) was withheld for 4 hours prior to drug treatment but with water ad libitum was provided thereafter. Following range-finding studies in both species a full acute toxicity study using ten animals per dose level, equally divided as to sex was performed. Both compounds were administered to both species orally on a mg/kg body weight basis. Signs of acute intoxication as well as mortality over the 24 hour period following drug administration were recorded. All surviving animals were maintained for the following fourteen days in order to detect delayed mortality. All accumulated mortality data were statistically analyzed according to the method of Litchfield and Wilcoxon (J. Pharmacol. Exper. Therap. 96; 99–113, 1949).

Results

A data analysis, summarising the results of the acute toxicologal tests of both compounds in mice and rats, is presented in Table I below:

TABLE I

| Species | Compound | No. of animals | Data Analysis mg/kg LD50 ± S.E.M. | LD50 Range* |
|---|---|---|---|---|
| Mouse | "Clofibrate" | 50 | 1570 ± 171.7 | 1276–1931 |
|  | Amine salt | 40 | 1700 ± 243.5 | 1250–2312 |
| Rat | "Clofibrate" | 40 | 1900 ± 313.1 | 1462–2470 |
|  | Amine salt | 40 | 1850 ± 148.5 | 1580–2153 |

S.E.M. — standard error of the mean
*Range for 95% confidence level

Summary

From the data presented in the foregoing table, it can be seen that in the mouse neither compound was found to be more or less toxic than the other, with $LD_{50}$ values of 1570 ± 171.7 mg/kg for "Clofibrate" and 1700 ± 243.5 for the ethylenediamine salt. A similar result was found in the rat, wherein the respective $LD_{50}$ values were 1,900 ± 313.1 mg/kg for "Clofibrate" and 1850 ± 148.5 mg/kg for the ethylene diamine salt.

While the foregoing description describes the preparation of certain illustrative amine salts of p-chlorophenoxyisobutyric acid, and methods for making these salts as well as certain pharmaceutical compositions suitable for administering the novel salts in therapeutic applications, it is to be understood that the invention is not to be limited thereto except as set forth in the appended claims.

What is claimed is:

1. An amine salt of p-chlorophenoxyisobutyric acid which has the formula:

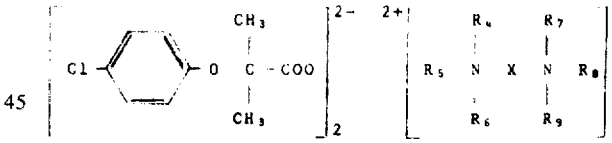

wherein X is a straight chain lower alkylene, and $R_4$, $R_5$, $R_6$, $R_7$, $R_8$ and $R_9$ are each hydrogen.

2. The ethylenediamine salt of p-chlorophenoxyisobutyric acid.

* * * * *